United States Patent [19]
Zelenka

[11] 3,774,136
[45] Nov. 20, 1973

[54] TEMPERATURE RESPONSIVE SWITCH

[75] Inventor: Donald J. Zelenka, Flushing, Mich.

[73] Assignee: General Motors Corporation, Detroit, Mich.

[22] Filed: Dec. 4, 1972

[21] Appl. No.: 311,515

[52] U.S. Cl.................. 337/382, 337/123, 337/380
[51] Int. Cl. ............................................ H01h 37/46
[58] Field of Search................... 337/382, 383, 388, 337/393, 394, 380, 123, 384

[56] References Cited
UNITED STATES PATENTS

| | | | |
|---|---|---|---|
| 3,212,337 | 10/1965 | McCarrick........................... | 337/394 |
| 3,529,272 | 9/1970 | Johnson et al...................... | 337/380 |
| 3,680,022 | 7/1972 | Bright................................. | 337/394 |
| R17,993 | 10/1931 | Denison.............................. | 337/383 |

*Primary Examiner*—Harold Broome
*Attorney*—Sidney Carter et al.

[57] ABSTRACT

This invention relates to a switch and more particularly to a temperature responsive switch used in a catalytic converter generally found in internal combustion engine exhaust systems. The temperature switch is an independent self-contained unit that is mounted directly on the converter and has a sensing element that extends into the converter to activate switch contacts to provide an initial warning as well as a second warning that the catalyst within the converter may become ineffective due to deterioration of the catalyst, and therefore maintenance of the converter is required.

4 Claims, 1 Drawing Figure

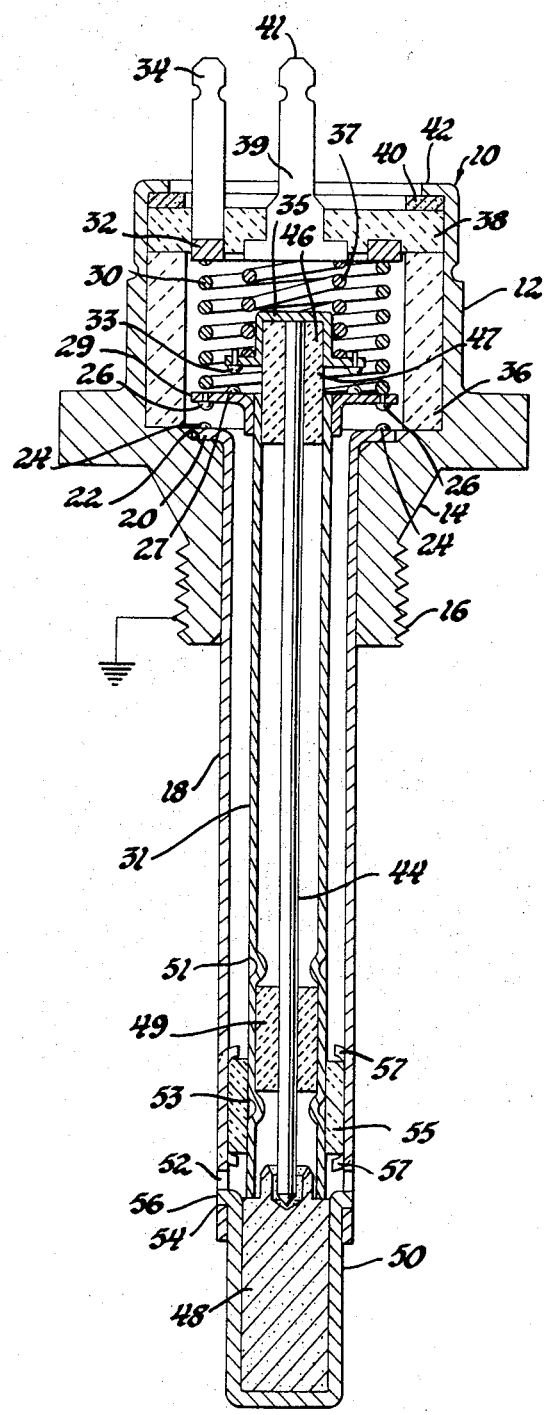

TEMPERATURE RESPONSIVE SWITCH

This invention relates to a temperature responsive switch having a sensing element inserted into a catalytic converter to provide a warning that the converter is not functioning properly because the catalyst is becoming ineffective due to deterioration. Problems of air pollution from internal combustion engines and the use of catalytic converters in the exhaust system of such engines to minimize air pollution has led to the requirement for a simple and inexpensively manufactured temperature sensing device to be used within the converter to detect failure of the catalyst in the converter. Most of the similar devices available are delicately constructed as well as expensive to manufacture and therefore impractical for use in the automobile application. Similar devices available do not perform properly in the rigorous environment and the rigorous use that they are put to when installed in automobile converters and further any sensors practical for use are very costly and complex to produce by mass production techniques.

Accordingly, it is an object of the present invention to provide a simple, reliable and inexpensive switch having means for sensing the failure of a catalyst in a catalytic converter.

Another object is to provide a switch that gives an initial warning and a second warning of catalyst failure.

A further object is to provide a warning device that is directly connected to a converter and has a sensing element on a probe within the converter that is constructed of the same catalyst material found in the converter.

Another object is to provide a temperature sensing switch having interchangeable sensing means.

Another object of the invention is to provide a temperature sensing switch that can be produced and assembled by mass production techniques.

A further object is to provide a temperature sensing switch that is compact and self-contained and therefore can be manufactured and adapted for use as an assembly for easy insertion into a converter.

Further objects and advantages of the present invention will be apparent from the following description, reference being had to the accompanying drawing wherein a preferred embodiment of the present invention is clearly shown.

The FIGURE shows a cutaway sectional view of the preferred embodiment of the invention.

Referring to the drawing, there is shown a switch housing 10 generally constructed of a one-piece body member 12 that may be made of stainless steel or the like, having attachment means 14 in the form of a threaded neck portion 16 at one end thereof.

Assembled within the body 12 is a tube assembly 18 that has an integral flared out attaching portion 20 at one end thereof that rests on a shoulder 22 in body 12 and makes electrical contact with the body. Tube assembly 18 extends through the neck portion 16 and is of sufficient length to extend into the catalyst bed of the converter, when the housing is attached to the converter. Tube assembly 18 and the flared attaching portion 20 are made of stainless steel or Inconel or similar type metals in order to withstand the heat within the converter. Electrically connected to tube assembly 18 are a set of contacts 24 that may be formed directly on the flared portion 20 of the tube or may be independently formed and attached thereto by some means such as welding, brazing or the like. A second set of contacts 26 are located opposite contacts 24 and are attached to a flange 29 on a second movable tube 31 assembled within tube assembly 18. Spring 30 that rests on the flange 29 electrically connects contacts 24,26, when they are closed, to a terminal 32 having a connector 34 that extends through the body 12 at the end opposite from the threaded neck portion 16. A third and fourth set of contacts are also located within body 12. The third set of contacts 27 are located on flange 29 inwardly and on the opposite side of the flange from contacts 26. A fourth set of contacts 33 are located opposite contacts 27 and are attached to a movable yoke shaped member 35. A second spring 37 which rests on the yoke member 35 electrically connects contacts 27,33, when closed, to a second terminal 39 having a connector 41 which also extends through the body 12 adjacent the first connector 34 at the end opposite from the threaded neck portion 16.

Contacts 26,27, and 33, springs 30 and 37 and the terminals 32 and 39 are electrically insulated from the body 12 by insulating means 36,38. Insulator means 36 can be a ceramic insulator, and insulator 38 can be made of mica, for example. The components assembled within the body 12 are held in place by a spacer 40 and rolled-over portions 42 formed on the body 12 that bear against insulating means 36,38.

Within the second tube assembly 31 is an actuator rod 44 that fits into the yoke 35 at 46. Actuator rod 44 is electrically insulated from the second tube 31 and yoke member 35 by ceramic insulator sleeves 47 and 49 that are held in position by any convenient means, such as outturned ear members 51,53 formed in the tube 31. Tube 31 is also electrically insulated from tube 18 by a ceramic sleeve 58 held in position by outturned portions 57 formed in tube 18. The actuator rod and tube 31 may be made of stainless steel or Iconel and both generally extend the full length of the tube assembly and engage a second rod 48 that is formed of a catalyst material which is inserted in a second tube or can member 50. The catalyst material that makes up the second rod 48 is the same as the catalyst material formed in the converter. It is understood that metal or other means having a melt point or deterioration point the same as the catalyst could be used. The length of the tubular formed catalyst 48 is such that it forces actuator rod 44 and the second movable tube 31 upwardly into the body member 12 to push the springs 30 and 37 toward terminals 32,39 to open the contacts 24,26, 27 and 33. Actuator rod 44 and movable tube 31 are therefore spring biased in a downward direction, and all the contacts are normally open. Can member 50 is connected to tubular member 18 by a bayonet type connection 52. Bayonet connector 52 is generally formed of a pair of ear members 54 on tubular member 18 and mating pin members 56 on the can 50 with such connectors being well known in the art.

In operation the housing 10 is screwed into a catalytic converter forming a path to ground through neck 16. The tubular member 18 having the axial rod 44 and second tube 31 therein and attached can 50 extend into the catalyst bed in the converter. The length of the catalyst rod 50 determines the distance that the contacts are apart and therefore determines the length of time the catalyst within the converter can be exposed to high temperature without damage. If the catalyst is exposed to high temperature beyond this period, the catalyst in the converter will began to deteriorate. However, the catalyst rod 48 being of a smaller volume than the catalyst bed in the converter will deteriorate faster than the catalytic bed and due to deterioration will shrink causing actuator rod 44 and second tube 31 urged by springs 30 and 37 to move downwardly. When the catalyst rod 48 has deteriorated to the point where the catalyst could be damaged, contacts 24,26 close to provide a signal through connector 34 and ground, to a telltale or the like that the catalyst within the converter has initially deteriorated and should be serviced. When the rod 48 has deteriorated to the point where not only the catalyst but the converter as well could be damaged, the second set of contacts 27,33 close to provide a second warning signal through connector 41 and ground to a second telltale or the like that at this point, the engine should be stopped to prevent further damage. As an example, when catalyst rod 48 begins to shrink at the critical temperature of 1,600° F., the circuit is completed to ground through connector 34. Additional exposure will cause additional shrinkage to cause the second warning. The times of the first and second warnings are determined by the length of catalyst rod 48. It is understood that in addition to the warning signal or instead of a warning signal the signal could be used to activate a bypass valve means, within the converter, or outside of the converter to bypass the exhaust gas around the catalyst bed until it cools to a safe operating temperature.

Upon the converter being serviced, which would generally be at time that replacement of the catalyst is required, the can member 50 is disconnected from the tubular assembly 18 and catalyst rod 48 within can 50 is replaced or a new can member containing the catalyst rod could be replaced as a unit.

It is readily apparent that the temperature switch is an easily constructed simple device that is easily assembled and has a replaceable sensor at one end that can be readily serviced at minimal cost.

While the embodiments of the invention as herein disclosed constitute a preferred form, it is to be understood that other forms could be adopted.

I claim:

1. A temperature responsive electrical switch comprising: a body having attachment means thereon; a first tubular member having one end in said body in electrical contact therewith, and the other end extending therefrom; first contact means on the one end of said tubular member; a second tubular member within said first tubular member electrically insulated therefrom, and having second contact means opposite said first contact means and third contact means on the side opposite said second contact means; a first spring electrically connecting said second contact means to a terminal on said body; a fourth set of contact means opposite said third set of contact means; a second spring electrically connecting said third and fourth contact means to a second terminal on said body, insulator means electrically insulating said contacts, springs, and terminals from said body; an actuator rod, within said second tubular member electrically insulated therefrom and in engagement with said fourth contact means, with said second tubular member and actuator rod being in contact with an expendable sensing means.

2. A temperature responsive electrical switch adapted to be used in a catalytic converter to detect catalyst failure comprising: a body having attachment means at one end thereof for attachment to the converter; a first tubular member having one end in said body in contact therewith, and the other end extending therefrom through said attachment means wherein said other end of the tubular member is adapted to extend into the converter; a first set of contacts on said one end of the tubular member; a second tubular member within said first tubular member electrically insulated therefrom, and having a second set of contacts opposite said first set of contacts, and a third set of contacts on the tubular member on the side opposite said second contact means; spring means electrically connecting said second set of contacts to a first terminal on said body at the end opposite said attachment means; a fourth set of contact means opposite said third set of contacts; a second spring electrically connecting said third and fourth contact means to a second terminal on said body; insulator means within said body, to electrically insulate said contacts, said spring means and said terminal from said body; an actuator rod within said second tubular member electrically insulated therefrom and in engagement with said fourth contact means; said second tubular member and actuator rod being in contact with a removable expendable sensing means attached at the other end of said first tubular member of sufficient length to cause said second tubular member and actuator rod to maintain said contacts in an open position.

3. A temperature responsive electrical switch adapted to be used on a catalytic converter to detect catalyst failure within the converter comprising: a body having attachment means at one end adapted for attachment to the converter; a first tubular member having one end in electrical contact with said body, and the other end extending therefrom and being of sufficient length to extend through said attachment means and into the converter; a first set of contacts on said one end of the tubular member; a second tubular member within said first tubular member electrically insulated therefrom, and having a second set of contacts opposite said first set of contacts, and a third set of contacts on the tubular member on the side opposite said second contact means; first spring means electrically connecting said second set of contacts to a first terminal on said body at the end opposite said attachment means; a yoke member having an insulated indentation substantially at the center; a fourth set of contacts on said yoke member at each end thereof opposite said third set of contacts; a second spring means attached to said yoke member to electrically connect said fourth set of contacts to a second terminal on said body located adjacent to said first terminal; insulator means within said body electrically insulating said second, third and fourth contact means, spring means and terminals from said body; an actuator rod within said second tubular member electrically insulated therefrom; said second tubular member and actuator rod being in contact with an expendable rod formed of a substantially similar catalyst as used in the converter; said expendable rod being held in a container that is attached to said first tubular member by removable connector means, and being of sufficient length to force said second tubular member to maintain said first and second contacts in a normally open position and said actuator rod into the indented portion on said yoke to maintain said third and fourth contacts in a normally open position.

4. A temperature responsive switch as set forth in claim 2, wherein the expendable sensing means is a rod comprising substantially the same catalyst as in the converter and being attached to said first tubular member by a removable container whereby upon catalyst failure in the converter said catalyst rod shrinks to cause the first and second set of contacts to close and provide a signal and upon further shrinkage said third and fourth contacts close to provide a second later signal.

* * * * *